(12) United States Patent
Song et al.

(10) Patent No.: US 11,530,660 B2
(45) Date of Patent: Dec. 20, 2022

(54) PHASE DIAGNOSIS METHOD AND APPARATUS

(71) Applicant: WEICHAI POWER CO., LTD., Shandong (CN)

(72) Inventors: Dawei Song, Neifang (CN); Xuebin Wang, Neifang (CN); Peng Huang, Neifang (CN)

(73) Assignee: WEICHAI POWER CO.. LTD., Weifang (CN)

( * ) Notice: Subject to any disclaimer, the term of this patent is extended or adjusted under 35 U.S.C. 154(b) by 0 days.

(21) Appl. No.: 17/256,595

(22) PCT Filed: Nov. 15, 2018

(86) PCT No.: PCT/CN2018/115645
§ 371 (c)(1),
(2) Date: Dec. 28, 2020

(87) PCT Pub. No.: WO2020/097853
PCT Pub. Date: May 22, 2020

(65) Prior Publication Data
US 2021/0270197 A1    Sep. 2, 2021

(51) Int. Cl.
*F02D 41/00* (2006.01)
*F02D 41/10* (2006.01)
(Continued)

(52) U.S. Cl.
CPC ........... *F02D 41/009* (2013.01); *F02D 41/10* (2013.01); *F02D 41/222* (2013.01);
(Continued)

(58) Field of Classification Search
CPC ...... F02D 41/009; F02D 41/10; F02D 41/222; F02D 41/401; F02D 2041/228; F02D 2200/0406; F02D 41/1497; Y02T 10/40
See application file for complete search history.

(56) References Cited

U.S. PATENT DOCUMENTS 4,896,634 A    1/1990   Kronich
5,529,034 A *  6/1996   Sone ................ F02D 41/221
                                              123/90.17
(Continued)

FOREIGN PATENT DOCUMENTS

CN          1309234 A      8/2001
CN        201810361 U      4/2011
(Continued)

OTHER PUBLICATIONS

PCT International Search Report and Written Opinion, PCT/CN2018/115645, dated Jun. 27, 2019, 14 pgs.
(Continued)

*Primary Examiner* — Phutthiwat Wongwian
*Assistant Examiner* — Susan E Scharpf
(74) *Attorney, Agent, or Firm* — Fenwick & West LLP

(57) ABSTRACT

A phase diagnosis method and apparatus. When it is verified that the location of an engine is valid, an oil injector performs spraying at a top center compression position; if no acceleration is detected after spraying, it indicates that a fault occurs; in order to detect whether it is a fault of phase deviation of the camshaft by 180 degrees, the oil sprayer performs spraying at the top center exhaust position and detects whether there is an acceleration; if an acceleration is detected, it indicates that the situation of the phase deviation of the camshaft by 180 degrees exists. In this way, the problem in the prior art of being unable to detect phase deviation when the phase of a camshaft is deviated by 180 degrees is solved.

8 Claims, 3 Drawing Sheets

(51) Int. Cl.
  *F02D 41/22* (2006.01)
  *F02D 41/40* (2006.01)
(52) U.S. Cl.
  CPC ...... *F02D 41/401* (2013.01); *F02D 2041/228* (2013.01); *F02D 2200/0406* (2013.01)

(56) References Cited

U.S. PATENT DOCUMENTS

| | | | |
|---|---|---|---|
| 7,017,548 B2* | 3/2006 | Sawada | F02P 5/1506 123/339.11 |
| 8,910,617 B2 | 12/2014 | Yokoyama et al. | |
| 2002/0092506 A1* | 7/2002 | Fujiki | F01L 1/34 123/478 |
| 2004/0149268 A1* | 8/2004 | Hasegawa | F02D 41/345 123/478 |
| 2005/0021220 A1* | 1/2005 | Nakamura | F02D 41/045 701/115 |
| 2007/0074702 A1 | 4/2007 | Nakamura et al. | |
| 2007/0277776 A1* | 12/2007 | Thomas | F02D 41/062 123/299 |
| 2009/0082939 A1 | 3/2009 | Iihoshi et al. | |
| 2012/0291722 A1 | 11/2012 | Kanda et al. | |
| 2013/0025568 A1 | 1/2013 | Yokoyama et al. | |
| 2017/0153626 A1 | 6/2017 | Oonishi | |

FOREIGN PATENT DOCUMENTS

| | | |
|---|---|---|
| CN | 202093146 U | 12/2011 |
| CN | 102713211 A | 10/2012 |
| CN | 103047022 A | 4/2013 |
| CN | 106814203 A | 6/2017 |
| CN | 108457761 A | 8/2018 |
| CN | 108561235 A | 9/2018 |
| JP | H01-280642 A | 11/1989 |
| JP | 2004-278324 A | 10/2004 |
| JP | 2004-285925 A | 10/2004 |
| JP | 2004-316460 A | 11/2004 |
| JP | 2005-016446 A | 1/2005 |
| JP | 2005-016485 A | 1/2005 |
| JP | 2005-061223 A | 3/2005 |
| JP | 2006-291738 A | 10/2006 |
| JP | 2009-215948 A | 9/2009 |
| JP | 2009-293580 A | 12/2009 |
| JP | 2011-032950 A | 2/2011 |
| JP | 2011064164 A | 3/2011 |
| JP | 5330923 B2 | 10/2013 |
| JP | 2016-196866 A | 11/2016 |
| JP | 2017-096203 A | 6/2017 |

OTHER PUBLICATIONS

Japan Patent Office, Office Action, JP Patent Application No. 2020-573498, dated Dec. 7, 2021, eight pages.
China National Intellectual Property Administration, Office Action, CN Patent Application No. 201880097573.7, dated Jun. 23, 2022, 17 pages.
Ham, W.K. et al., "A framework for simulation-based engine-control unit inspection," Control Engineering Practice, vol. 59, Feb. 2017, pp. 137-148.
Ji, J. et al., "Study on the three-dimensional transient dynamic FEA of camshaft strength," 2011 International Conference on Electronic & Mechanical Engineering and Information Technology, Aug. 2011, pp. 3689-3691.

* cited by examiner

PHASE DIAGNOSIS METHOD AND APPARATUS

TECHNICAL FIELD

The present application relates to the technical field of fault diagnosis, and in particular to a phase diagnosis method and a phase diagnosis device.

BACKGROUND

A camshaft is an important component of a piston engine, which is configured to control the opening and closing of a valve.

If the phase deviation of a camshaft is 180 degrees, for example, a signal plate of the camshaft is installed by a deviation of 180 degrees, or, the signal plate of the camshaft is installed normally but the angle calibration deviation of the camshaft is 180 degrees, the deviation of the phase of the camshaft may occur, thereby causing the engine to be abnormal.

In the conventional technology, however, if the phase deviation of the camshaft is 180, it cannot be detected.

SUMMARY

In view of this, a phase diagnosis method and a phase diagnosis device are provided by the present application, which solves the problem that the phase deviation cannot be detected once the camshaft phase deviates 180 degrees in the conventional technology.

A phase diagnosis method is provided by the present application, including: an injector injecting at a top dead center (TDC) timing of a compression stroke if it is detected that an engine position is valid; detecting whether an engine is accelerating; the injector performing injection at the TDC timing of an exhaust stroke if no acceleration is detected; detecting whether the engine is accelerating; indicating the camshaft phase deviation of 180 degrees if an acceleration is detected.

Alternatively, the method further includes: that detecting whether the engine position is valid including: collecting a crankshaft signal of a crankshaft position sensor and a camshaft signal of a camshaft position sensor; detecting whether the engine position is valid according to the crankshaft signal and the camshaft signal.

Alternatively, the method further includes: if the camshaft phase deviation of 180 degrees is detected, an alarm goes off.

Alternatively, the injector injects at the TDC timing of an exhaust stroke, to determine whether an acceleration is detected, including: the injector performing injection at the TDC timing of the exhaust stroke; detecting whether the engine is accelerating; if no acceleration is detected, detecting whether the preset number of injections are reached; if the preset number of injections is not reached, returning to the execution of injections to perform injection at the TDC timing of the exhaust stroke; if an acceleration is detected or the injector reaches the preset number of injections, ending the injection.

Alternatively, the preset detection conditions include: whether a water temperature meets a preset water temperature condition, and whether the intake pressure meets the preset intake pressure condition.

A phase diagnosis device is provided by the embodiment of the present application, including: a first injection unit, configured to control an injector to perform injection at a TDC timing of a compression stroke if an engine position is detected to be valid; a first detecting unit, configured to detect whether an engine is accelerating; a second injection and detecting unit, configured to control the injector to perform injection at the TDC timing of the exhaust stroke and detect whether the engine is accelerating; a deviation determination unit, configured to indicate that the camshaft phase deviates 180 degrees if an acceleration is detected.

Alternatively, the device further includes: a collecting unit, configured to collect a crankshaft signal of a crankshaft position sensor and a camshaft signal of a camshaft position sensor; a first detecting unit, configured to detect whether the engine position is valid according to the crankshaft signal and the camshaft signal.

Alternatively, the device further includes: an alarm unit, configured to go off if the camshaft phase deviation of 180 degrees is detected.

Alternatively, the device further includes: a second injection subunit, configured to control the injector to perform injection at the TDC timing of the exhaust stroke; a second detecting subunit, configured to detect whether the engine is accelerating; a third detecting subunit, configured to detect whether the preset number of injections are reached if no acceleration is detected; a return execution unit, configured to return to execute the injection at the TDC timing of the exhaust stroke if the preset number of injections is not reached; an injection end unit, configured to end the injection if an acceleration is detected or the injector reaches the preset number of injections.

Alternatively, preset detection conditions include: whether a water temperature meets a preset water temperature condition, and whether a intake pressure meets a preset intake pressure condition.

The embodiment provided by the present application provides a phase diagnosis method and a phase diagnosis device, if it is verified that the position of an engine is valid, an injector performs injection at the TDC timing of the compression stroke; if no acceleration is detected after injection, it indicates that a fault occurs; in order to detect whether it is a fault of phase deviation of the camshaft by 180 degrees, the injector performs injection at the TDC timing of the exhaust stroke and whether there is an acceleration is detected. If an acceleration is detected, it indicates that the situation of the phase deviation of the camshaft by 180 degrees exists. In this way, the problem in the conventional technology of being unable to detect phase deviation, in the case that the camshaft phase deviates 180 degrees, is solved.

BRIEF DESCRIPTION OF THE DRAWINGS

For more clearly illustrating embodiments of the present application or the technical solutions in the conventional technology, drawings to be used in the description of the embodiments or the conventional technology will be briefly described hereinafter. Apparently, the drawings in the following description are only some embodiments of the present application. For those skilled in the art, other drawings may be obtained based on the provided drawings without any creative work.

DETAILED DESCRIPTION OF THE EMBODIMENTS

The following description of the preferred embodiments is only exemplary, and is by no means a limitation to the present application and its application or usage.

Figure 1:
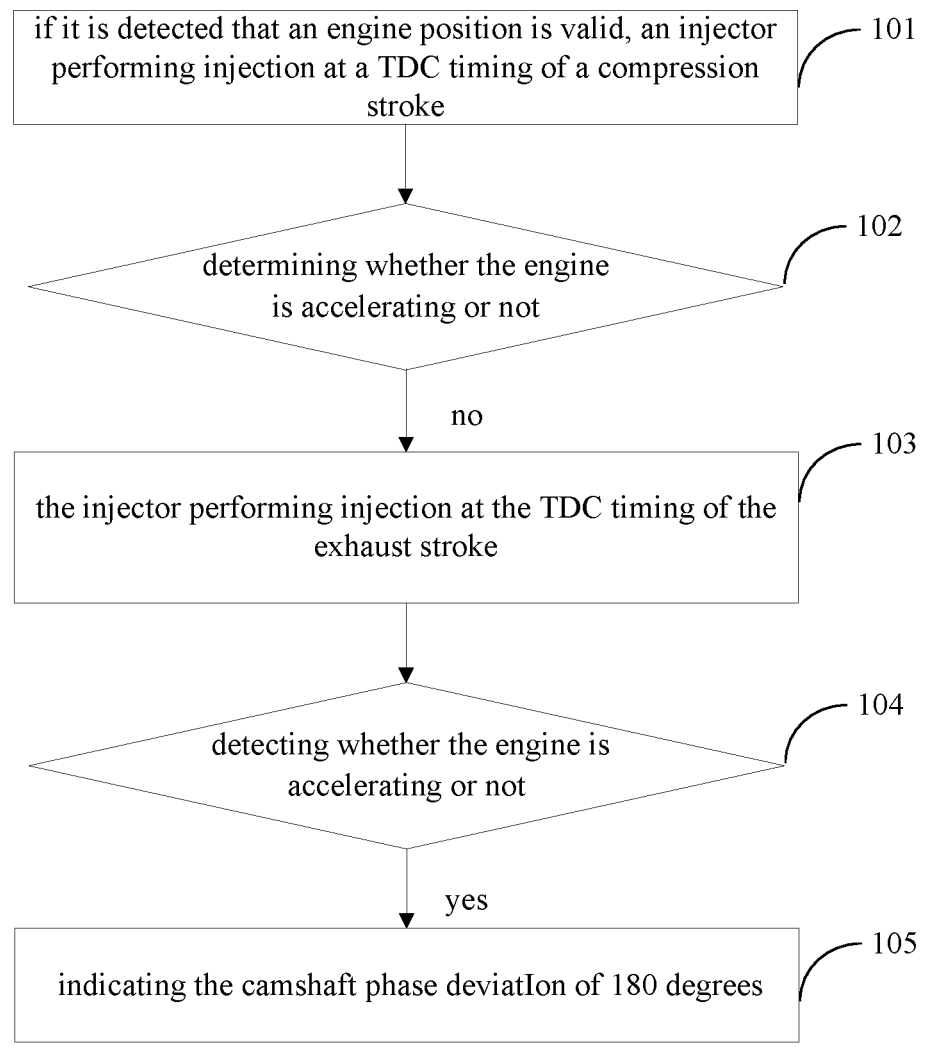
FIG. 1 shows a schematic flowchart of a phase diagnosis method provided by an embodiment of the present application.

Referring to FIG. 1, a schematic flowchart of a phase diagnosis method provided by an embodiment of the present application is shown, in this embodiment, the method includes: S101: if it is detected that an engine position is valid, an injector performing injection at a TDC timing of a compression stroke; for engine control, finding a mechanical position of an engine is important, which may be used for determining the TDC timing of a piston to further perform accurate injection. In this embodiment, the engine position is determined through a crankshaft signal and a camshaft signal collected by a crankshaft sensor and a camshaft sensor.

The crankshaft signal detected by the crankshaft position sensor may be used for determining a rotational position of the engine, and the camshaft position signal detected by the camshaft position sensor may be used for determining the TDC timing of the compression stroke and the TDC timing of the exhaust stroke of the engine. After these positions are valid, it means that the engine position is valid, and fuel injection may be performed at the TDC timing of the compression stroke.

S102: determining whether the engine is accelerating or not; in this embodiment, after the injector is injected, the engine may accelerate under normal circumstances. If there is no acceleration, it means that the engine has malfunctioned. However, there are many faults that cause no acceleration after the injector is injected, but technicians usually ignore the case that the camshaft shaft phase deviates 180 degrees (that is, the detected camshaft phase deviation is 180 degrees). Specifically, the device for determining whether the engine is accelerating or not includes a crankshaft speed sensor and a crankshaft signal wheel, and the crankshaft speed sensor can calculate the real time speed of the engine through reading the number of teeth of crankshaft signal wheel passing over the crankshaft speed sensor in a unit time, thereby whether the engine is accelerating or not is determined.

In the conventional technology, it is also impossible to verify the case that the camshaft shaft deviates 180 degrees.

In order to solve the above problems, the following steps will verify whether the camshaft shaft phase deviates 180 degrees or not.

S103: if no acceleration is detected, the injector performing injection at the TDC timing of the exhaust stroke; if the camshaft shaft phase deviates 180 degrees, the TDC timing of the compression stroke and the TDC timing of the exhaust stroke of the engine, which are determined, are reversed, that is, the detected TDC timing of the compression stroke is actually the detected TDC timing of the exhaust stroke, and the detected TDC timing of the exhaust stroke is actually the TDC timing of the compression stroke.

In the conventional technology, however, when detecting whether the engine position is valid, that is, when detecting the phase of the crankshaft and the phase of the camshaft, if a camshaft signal plate is installed incorrectly by 180 degrees, the phase of the camshaft deviates 360 degrees with respect to the crankshaft. In a case that the camshaft signal plate is installed correctly, if a phase angle of the crankshaft at the detection point is a, the phase angle of the camshaft at the detection point is b; in a case that the camshaft signal plate is installed incorrectly by 180 degrees, if the crankshaft rotates to a position of 360 degrees and the camshaft rotates to a position of 180 degrees, at the detection point, a phase angle of the crankshaft at the detection point is still a, the phase angle of the camshaft is still b. That is to say, in the conventional technology, if the camshaft signal plate is installed reversely by 180 degrees or the phase calibration deviates by 180 degrees, the deviation cannot be detected.

In this embodiment, in order to detect whether the camshaft deviation is 180 degrees or not, after the injector performs injection at the TDC timing of the compression stroke, if an acceleration is not detected, injection is performed at a reverse position of the TDC timing of the compression stroke. The reverse position of the TDC timing of the compression stroke is the TDC timing of the exhaust stroke.

S104: detecting whether the engine is accelerating or not;

S105: if an acceleration is detected, indicating the camshaft phase deviation of 180 degrees.

In this embodiment, if no acceleration is detected after the injector performs injection at the TDC timing of the exhaust stroke, it means that it is not a malfunction of the camshaft phase deviation of 180 degrees, but if an acceleration is detected, it means that the camshaft phase deviates 180 degrees.

In this embodiment, when it is verified that the engine position is valid, the injector performs injection at the TDC timing of the compression stroke. If no acceleration is detected after injection, it means that there is a malfunction. In order to detect whether it is a malfunction of the camshaft phase deviation of 180 degrees, the injector performs injection at the TDC timing of the exhaust stroke and whether there is an acceleration is detected. If an acceleration is detected, it indicates that the situation of the phase deviation of the camshaft by 180 degrees exists. In this way, the problem in the conventional technology that the phase deviation cannot be detected if the camshaft phase deviates 180 degrees is solved.

Figure 2:
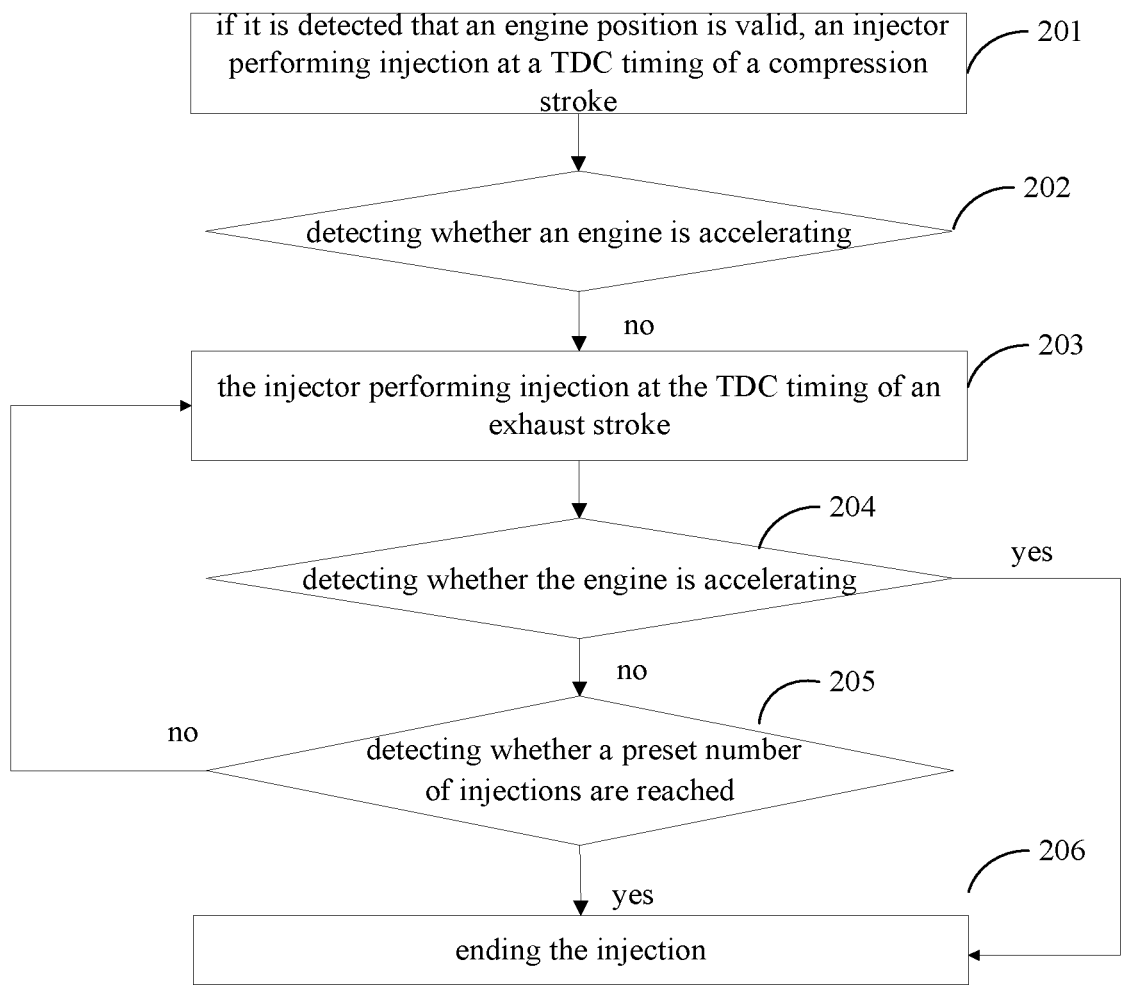
FIG. 2 shows a schematic flowchart of a phase diagnosis method provided by another embodiment of the present application.

Referring to FIG. 2, a schematic flowchart of a phase diagnosis method provided by another embodiment of the present application is shown, in this embodiment, when detecting whether the camshaft phase deviation is 180 degrees, in order to improve the effectiveness of the detection, the number of injections may be set, for example, the number of injections may be at least one, and the specific number can be set by according to the actual situation. the method includes: S201: if it is detected that an engine position is valid, an injector performing injection at a TDC timing of a compression stroke; S202: detecting whether an engine is accelerating; S203: if no acceleration is detected, the injector performing injection at the TDC timing of an exhaust stroke; S204: detecting whether the engine is accelerating; S205: if no acceleration is detected, detecting whether a preset number of injections are reached; S206: if the preset number of injections is not reached, the injector performing injection at the TDC timing of the exhaust stroke again, and returning to execute the detection of whether an acceleration is detected; S207: if an acceleration is detected or the injector reaches the preset number of injections, the injection ends, wherein a number of injections can be recorded by an ECU, and if the number of injections reaches the preset number of injections, it is determined that the preset number of injections is reached, and if the number of injections does not reach the preset number of injections, it is determined that the preset number of injections is not reached.

In this embodiment, when it is verified that the engine position is valid, the injector performs injection at the TDC timing of the compression stroke. If no acceleration is detected after injection, it means that there is a malfunction. In order to detect whether it is a malfunction of the camshaft phase deviation of 180 degrees, the injector performs injection at the TDC timing of the exhaust stroke and whether there is acceleration is detected. If an acceleration is detected, it indicates that the situation of the phase deviation of the camshaft by 180 degrees exists. In this way, the problem in the conventional technology that the phase deviation cannot be detected if the camshaft phase deviates 180 degrees is solved.

Figure 3:
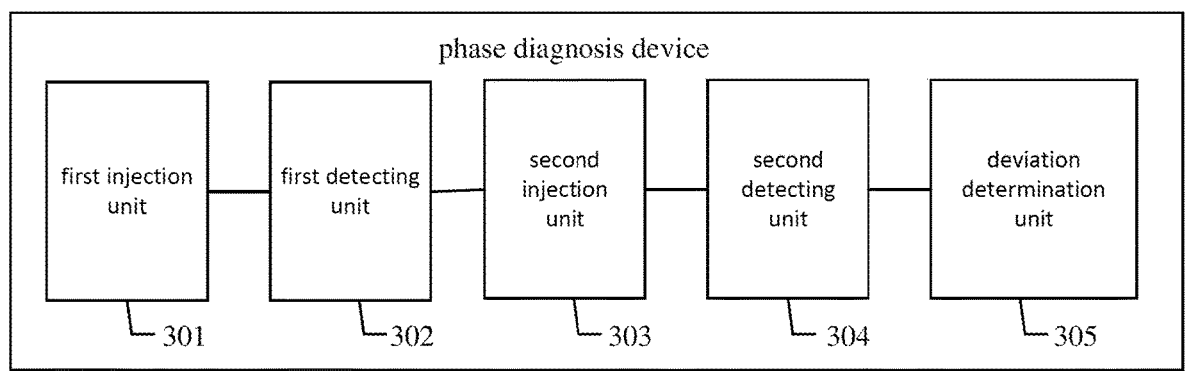
FIG. 3 shows a schematic structural diagram of a phase diagnosis device provided by the embodiment of the present application.

Referring to FIG. 3, a schematic structural diagram of a phase diagnosis device provided by an embodiment of the present application is shown, in this embodiment, the device includes: a first injection unit 301, configured to control an injector to perform injection at a TDC timing of a compression stroke if an engine position is detected to be valid; a first detecting unit 302, configured to detect whether an engine is accelerating or not; a second injection unit 303, configured to control the injector to perform injection at a TDC timing of an exhaust stroke if an acceleration is detected; a second detecting unit 304, configured to detect whether the engine is accelerating or not; a deviation determination unit 305, configured to indicate that the camshaft phase deviates 180 degrees if an acceleration is detected.

Alternatively, the device further including: an alarm unit, configured to go off if the camshaft phase deviation of 180 degrees is detected.

Alternatively, the second determining unit further includes: a second detecting subunit, configured to detect whether the engine is accelerating or not after the injector performs injection at the TDC timing of the exhaust stroke firstly; a third detecting subunit, configured to detect whether a preset number of injections are reached if no acceleration is detected; a return execution unit, configured to control the injector to perform injection at the TDC timing of an exhaust stroke again if the preset number of injections is not reached, and return to execute to detect whether the engine is accelerating or not; an injection end unit, configure to end the injection if an acceleration is detected or the injector reaches the preset number of injections.

Alternatively, the preset detection conditions includes: whether a water temperature meets a preset water temperature condition, and whether a intake pressure meets a preset intake pressure condition.

In this embodiment, if it is verified that the engine position is valid, the injector performs injection at the TDC timing of the compression stroke. If no acceleration is detected after injection, it means that there is a malfunction. In order to detect whether it is a malfunction of the camshaft phase deviation of 180 degrees, the injector performs injection at the TDC timing of the exhaust stroke and whether there is an acceleration is detected. If an acceleration is detected, it indicates that the situation of the phase deviation of the camshaft by 180 degrees exists. In this way, the problem in the conventional technology that the phase deviation cannot be detected if the camshaft phase deviates 180 degrees is solved.

The above embodiments are described in a progressive manner. Each of the embodiments is mainly focused on describing its differences from other embodiments, and reference may be made among these embodiments with respect to the same or similar parts.

The above illustration of the disclosed embodiments can enable those skilled in the art to implement or use the present application. Various modifications to the embodiments are apparent to the person skilled in the art, and the general principle herein can be implemented in other embodiments without departing from the spirit or scope of the present application. Therefore, the present application is not limited to the embodiments described herein, but should be in accordance with the broadest scope consistent with the principle and novel features disclosed herein.

The invention claimed is:

1. A phase diagnosis method, comprising:
   an injector performing injection at a TDC timing of a compression stroke, if it is detected that an engine position is valid;
   detecting whether an engine is accelerating based on a crankshaft signal detected by a crankshaft position sensor;
   the injector performing injection at the TDC timing of an exhaust stroke, if no acceleration is detected;
   detecting whether the engine is accelerating based on the crankshaft signal detected by the crankshaft position sensor; and
   determining camshaft phase deviation of 180 degrees based on a camshaft signal detected by a camshaft position sensor and the crankshaft signal detected by the crankshaft position sensor, if an acceleration is detected,
   wherein that the injector performing injection at the TDC timing of the exhaust stroke and detecting whether the engine is accelerating comprises:
   the injector performing injection at the TDC timing of the exhaust stroke;
   detecting whether the engine is accelerating;
   detecting whether a preset number of injections are reached by counting the injections by a second detecting unit, if no acceleration is detected;
   returning to execute the injector performing injection at the TDC timing of the exhaust stroke, if the preset number of injections are not reached; and
   ending the injection, if an acceleration is detected or the injector reaches the preset number of injections.

2. The method according to claim 1, wherein that detecting whether the engine position is valid comprises:
   collecting the crankshaft signal of the crankshaft position sensor and the camshaft signal of the camshaft position sensor; and
   determining whether the engine position is valid according to the crankshaft signal and the camshaft signal.

3. The method according to claim 1, further comprising:
   an alarm going off if the camshaft phase deviation of 180 degrees is detected.

4. The method according to claim 1, wherein preset detection conditions comprise:
   whether a water temperature is greater than a preset water temperature and whether an intake pressure is greater than a preset intake pressure.

5. A phase diagnosis device, comprising:
   a first injector, configured to control an injector to perform injection at a TDC timing of an exhaust stroke if an engine position is detected to be valid;
   a first detector, configured to detect whether an engine is accelerating based on a crankshaft signal detected by a crankshaft position sensor;

a second injector and detector, configured to control the injector to perform injection at the TDC timing of the exhaust stroke and detect whether the engine is accelerating;

a deviation determinator, configured to indicate camshaft phase deviates 180 degrees based on a camshaft signal detected by a camshaft position sensor and the crankshaft signal detected by the crankshaft position sensor, if an acceleration is detected, and an alarm, configured to go off, if camshaft phase deviation of 180 degrees is detected.

6. The phase diagnosis device according to claim 5, further comprising:

a collector, configured to collect the crankshaft signal of the crankshaft position sensor and the camshaft signal of the camshaft position sensor;

a first determiner, configured to determine whether the engine position is valid according to the crankshaft signal and the camshaft signal.

7. The phase diagnosis device according to claim 5, comprising:

a second injector, configured to control an injector to perform injection at the TDC timing of a compression stroke;

a second sub-detector, configured to detect whether the engine is accelerating;

a third sub-detector, configured to detect whether a preset number of injections are reached by counting injections if no acceleration is detected;

a return executor, configured to return to execute the injector performing injection at the TDC timing of the exhaust stroke if the preset number of injections is not reached;

an injection end device, configure to end the injection if an acceleration is detected or the injector reaches the preset number of injections.

8. The phase diagnosis device according to claim 5, wherein preset detection conditions comprise:

whether a water temperature is greater than a preset water temperature, and whether an intake pressure is greater than a preset intake pressure.

* * * * *